United States Patent [19]

Kameya

[11] 4,215,391
[45] Jul. 29, 1980

[54] POWER CONVERSION DEVICE

[75] Inventor: Kazuo Kameya, Tsurugashima, Japan

[73] Assignee: Toko Inc., Tokyo, Japan

[21] Appl. No.: 926,889

[22] Filed: Jul. 21, 1978

[30] Foreign Application Priority Data

Jul. 29, 1977 [JP] Japan .................................. 52-91085

[51] Int. Cl.² .................................................. H02M 3/335
[52] U.S. Cl. .......................................... 363/25; 363/97
[58] Field of Search ................ 323/23, 25, 62; 363/24, 363/25, 34, 37, 71, 80, 82, 89, 90, 97, 131–134

[56] References Cited
U.S. PATENT DOCUMENTS

| | | | |
|---|---|---|---|
| 3,219,907 | 11/1965 | Josephson | 363/97 |
| 3,443,194 | 5/1969 | Cielo | 363/97 X |
| 3,443,195 | 5/1969 | Hoffman et al. | 363/97 X |
| 3,970,916 | 7/1976 | Kienscherf | 363/71 |
| 4,086,526 | 4/1978 | Grüdelbach | 323/23 X |

*Primary Examiner*—A. D. Pellinen
*Attorney, Agent, or Firm*—Schwartz, Jeffery, Schwaab, Mack, Blumenthal & Koch

[57] ABSTRACT

A power control circuit which includes at least one DC power source; and at least one transformer including an excitation winding, a primary winding and a secondary winding; at least two transistors; and at least two diodes. In this circuit, a current increasing with time is caused to flow through the primary winding after energy has been accumulated in the excitation winding. Furthermore, a current induced in the secondary winding by the current of the primary winding and a current resulting from the energy of the excitation winding are superimposed upon each other, and the current resulting from such superimposition is rectified so that there is provided a continuous output.

10 Claims, 11 Drawing Figures

POWER CONVERSION DEVICE

BACKGROUND AND SUMMARY OF THE INVENTION

This invention relates to a power control circuit, and it is an object of this invention to provide a power control circuit based on an entirely new concept having an improved ratio of input power supplied from a power source to output power available at the output end thereof, i.e., power conversion efficiency. The power control circuit provides highly stable output power with respect to power source fluctuations as well as load variations and has a fast control response. The circuit design may be miniaturized and light weight, and is highly reliable.

As will be appreciated from the following description, the present invention is most effectively applicable to various types of power amplifiers, DC-to-AC power converters, AC-to-AC power converters, stabilized DC power supply devices, stabilized AC power supply devices, etc., for example, although it is not limited thereto in any way.

Briefly stated, the present invention provides a power control circuit including a transformer having an excitation winding, a primary winding and a secondary winding, wherein after energy has been accumulated in the excitation winding by flowing a current therethrough, a current which varies with time is made to flow through the primary winding so that a current is induced in the secondary winding. The thus induced current is superimposed upon a current resulting from the energy accumulated in the excitation winding, and a current resulting from the superimposition is rectified to provide an output.

Other objects, features and advantages of the present invention will become apparent from the following description taken in conjunction with the accompanying drawings.

DETAILED DESCRIPTION OF THE PREFERRED EMBODIMENTS

Figure 1:
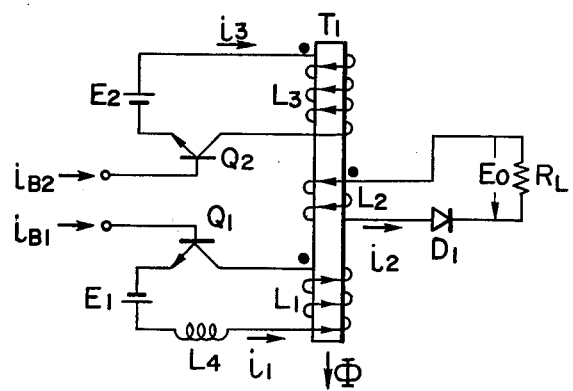
FIG. 1 is a circuit diagram illustrating the basic concept of the present invention.

Referring to FIG. 1 of the drawings, there is shown a basic circuit arrangement according to this invention, which includes a transformer $T_1$ having a primary winding $L_1$, a secondary winding $L_2$ and an excitation winding $L_3$; a series circuit formed by a DC power source $E_1$, a transistor $Q_1$, the primary winding $L_1$ of the transformer $T_1$ and an excitation coil $L_4$; and another series circuit formed by the excitation winding $L_3$ of the transformer $T_1$, a DC power source $E_2$ and a transistor $Q_2$. The secondary winding $L_2$ of the transformer $T_1$ is connected with a load $R_L$ through a diode $D_1$. As will be appreciated from what will be described hereinafter, the excitation coil $L_4$ serves to cause the current flowing through the primary winding $L_1$ to be increased with time at the start of the operation of the present circuit.

Figure 2:
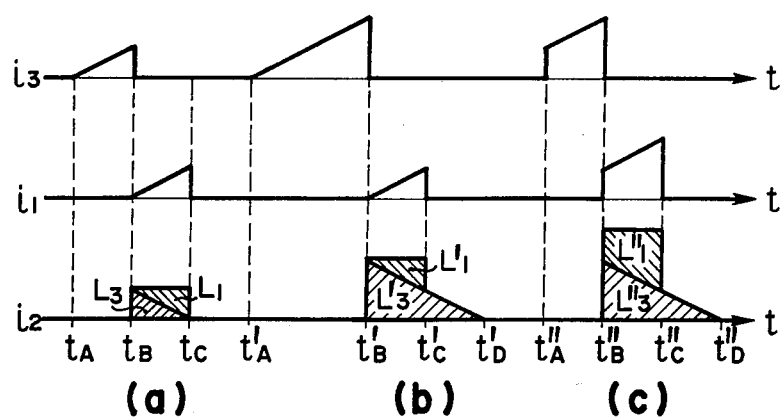
FIG. 2 is a view showing waveforms which occur during the operation of the circuit shown in FIG. 1.

FIGS. 2 (a), (b) and (c) shows the current waveforms which occur at respective points in the circuit of FIG. 1. Description will now be made of the operation of this circuit.

Referring first to FIG. 2(a), at a point of time $t_A$, a base current $i_{B2}$ is imparted to the transistor $Q_2$ to render the latter conductive, so that an excitation current $i_3$ is supplied to the excitation winding $L_3$ of the transformer $T_1$. As a result, a voltage is induced in the secondary winding $L_2$ of the transformer $T_1$, but such an induced voltage is of reverse polarity with respect to the diode $D_1$ so that there flows no secondary current $i_2$; thus the excitation winding $L_3$ of the transformer $T_1$ becomes inductive so that the aforementioned excitation current increases from zero with time. Magnetic flux $\Phi$ occurring in the core of the transformer $T_1$ also increases in a direction such as indicated by an arrow mark.

At a point of time $t_B$, by interrupting the base current $i_{B2}$ imparted to the transistor $Q_2$, the latter is rendered nonconductive, and at the same time, the transistor $Q_1$ is renderd conductive by imparting a base current $i_{B1}$ thereto. Thus, the excitation current $i_3$ flowing through the excitation winding $L_3$ of the transformer $T_1$ falls to zero while the primary current $i_1$ flows through the primary winding $L_1$ of the transformer $T_1$. Since the excitation coil $L_4$ is inductive, the aforementioned primary current $i_1$ increases from zero with time.

In this way, a flyback voltage is produced in the secondary winding $L_2$ at the point of time $t_B$ by the energy stored in the excitation winding $L_3$ during the period from $t_A$ to $t_B$, whereby the secondary current $i_2$ is caused to flow so that the magnetic flux $\Phi$ which occurs in the core of the transformer $T_1$ becomes continuous.

At a point of time $t_C$, the transistor $Q_1$ is rendered non-conductive so that the primary current $i_1$ falls to zero. FIG. 2a shows the condition wherein no energy is stored in the transformer $T_1$ whereas energy is stored in the excitation coil $L_4$ by the primary current $i_1$.

During the period from $t_B$ to $t_C$, the aforementioned secondary current $i_2$ decreases with time as indicated by a hatched portion $L_3'$ in FIG. 2(a), whereas the secondary current $i_2$ increases from zero with time as indicated by a hatched portion $L_1'$ in FIG. 2(a), by virtue of the fact that the voltage induced in the secondary winding $L_2$ by the primary current $i_1$ is of forward polarity with respect to the diode $D_1$.

In this way, during the period from $t_B$ to $t_C$, the secondary current $i_2$ can be made to have a flat current waveform which results from the superimposition of the currents indicated by the hatched portions $L_3$ and $L_1$ in FIG. 2(a).

For the purpose of explanation, it is assumed in FIG. 2(b) that the circuit is in the initial state in which no energy is stored in the transformer $T_1$ or excitation coil $L_4$. At a point of time $t_A'$ by rendering the transistor $Q_2$ conductive, an excitation current $i_3$ is caused to flow through the excitation winding $L_3$ of the transformer $T_1$, and such a current again increases from zero with time. At a point of time $t_B'$, the transistor $Q_2$ is rendered non-conductive, and at the same time the transistor $Q_1$ is rendered conductive, so that the excitation current $i_3$ falls to zero, and the primary current $i_1$ increases from zero with time, as was the case with FIG. 2(a). By making the period from $t_A'$ to $t_B'$ longer than the period from $t_A$ to $t_B$ in FIG. 2(a), a higher current than that which flowed through the excitation winding $L_3$ at the point of time $t_B$ in FIG. 2(a) is made to flow therethrough at the point of time $t_B'$, so that correspondingly higher energy is stored in the transformer $T_1$ and the magnetic flux $\Phi$ which occurs in the core of the transformer $T_1$ increases. Furthermore, in order for the magnetic flux $\Phi$ to be continuous, secondary current $i_2$ is made to flow through the secondary winding $L_2$. At a point of time $t_C'$, the transistor $Q_1$ is rendered non-conductive, so that the primary current $i_1$ becomes nil. During the period from $t_B'$ to $t_D'$, the secondary current $i_2$ is induced by the excitation current $i_3$ decreases with time as indicated by a hatched portion $L_3'$ in FIG. 2(b). During the period from $t_B'$ to $t_C'$, the secondary current $i_2$ resulting from the primary current $i_1$ increases with time as indicated by a hatched portion $L_1'$ in FIG. 2(b). At the point of time $t_C'$, the secondary current $i_2$ resulting from the primary current $i_1$ becomes nil as can be seen from the hatched portion $L_1'$ in FIG. 2(b), but even after that point of time, the secondary current $i_2$ induced by the excitation current $i_3$ still flows while decreasing with time until it becomes nil, due to the fact that the energy stored in the excitation winding $L_3$ still remains therein for the period between $t_C'$ and $t_D'$ as can be seen from the hatched portion $L_3'$ in FIG. 2(b).

In this way, the secondary current $i_2$ which flows during the period from $t_B'$ to $t_C'$ can be made to have a flat current waveform as shown in FIG. 2(b) which results from superimposition of the currents indicated by the hatched portions $L_3'$ and $L_1'$. Furthermore, the secondary current $i_2$ has a higher value at the point of time $t_B'$ than at the point of time $t_B$.

By rendering the transistor $Q_1$ non-conductive and at the same time rendering the transistor $Q_2$ non-conductive at the point of time $t_C'$ when the energy stored in the excitation winding $L_3$ still remains, it is possible to obtain such a current waveform as that which occurs during the period from $t_B''$ to $t_D''$ as shown in FIG. 2(c).

At a point of time $t_A''$, the excitation current $i_3$ is made to have a value higher than zero and increase with time so that the residual magnetic flux occurring in the core of the transformer $T_1$ becomes continuous. Thus, the period from $t_A''$ to $t_B''$ is made to be equal to the period from $t_A$ to $t_B$ in FIG. 2(a), and at the point of time $t_B''$, the transistor $Q_2$ is rendered non-conductive and at the same time the transistor $Q_1$ is rendered conductive, so that the excitation current $i_3$ becomes nil after having reached a value higher than that at the point of time $t_B$.

If energy remains in the excitation coil $L_4$ at the point of time $t_B''$, then the primary current $i_1$ increases not from zero, but from a value higher than zero and increases with time. Thus, during the period from $t_B''$ to $t_C''$, the secondary current $i_2$ resulting from the primary current $i_1$ also rises from a value higher than zero and increases with time as indicated by a hatched portion $L_1''$ in FIG. 2(c). By rendering the transistor $Q_1$ non-conductive at the point of time $t_C''$, the primary current $i_1$ is made to be nil, and the current indicated by the hatched portion $L_1''$ is also made to be nil. Furthermore, during the period from $t_C''$ to $t_D''$, due to the fact that energy stored in the excitation winding $L_3$ still remains therein, the secondary current $i_2$ is as shown by a hatched portion $L_3''$ in FIG. 2(c) and decreases with time $t$ until it becomes nil. In this way, the secondary current $i_2$ flowing during the period from $t_B''$ to $t_C''$ can be made to have a flat waveform which results from superimposition of the currents indicated by the hatched portions $L_3''$ and $L_1''$ in FIG. 2(c). Furthermore, the secondary current $i_2$ has a higher value at the point of time $t_B''$ than at the point of time $t_B'$ in FIG. 2(b).

As will become apparent from the following description, the secondary current $i_2$ obtained from the secondary winding $L_2$ of the transformer $T_1$ through the diode $D_1$ is proportional to the sum of the current resulting from the energy accumulated in the excitation winding $L_3$ and the rise-up current flowing through the primary winding $L_1$. Thus, by controlling the energy accumulated in the excitation winding $L_3$ and the residual energy in the excitation coil $L_4$, the aforementioned secondary current $i_2$ can be controlled.

In this way, according to the present invention, the secondary current $i_2$ can be made to have a waveform which is flat or invariable with time and can be taken out in a controlled form. Though it is required that the energy accumulated in the excitation winding $L_3$ of the transformer $T_1$ be made such that the magnetic flux $\Phi$ occurring in the core of the transformer $T_1$ is lower than the saturation magnetic flux density, it is possible to take out energy higher than that immediately prior to a point when the saturation flux density occurs, due to the fact that the secondary current $i_2$ has the rise-up portion of the primary current $i_1$ added thereto. Moreover, in an attempt to take out a current from the secondary winding of a transformer concurrently with flowing of a current through the primary winding thereof, it has heretofore been the usual practice to increase the number of turns or inductance of each winding of the transformer for the purpose of reducing an excitation current which tends to flow through the primary winding of the transformer in such a direction to produce a detrimental effect. In contrast thereto, in accordance with the present invention, such an excitation current can be cancelled out by the energy accumulated in the excitation winding $L_3$, so that there flows no such excitation current; thus, the number of turns of each winding of the transformer may be reduced relative to the magnitude of the voltage available from the transformer. Thus, the transformer for use in the present invention can be miniaturized and easily manufactured.

Figure 3:
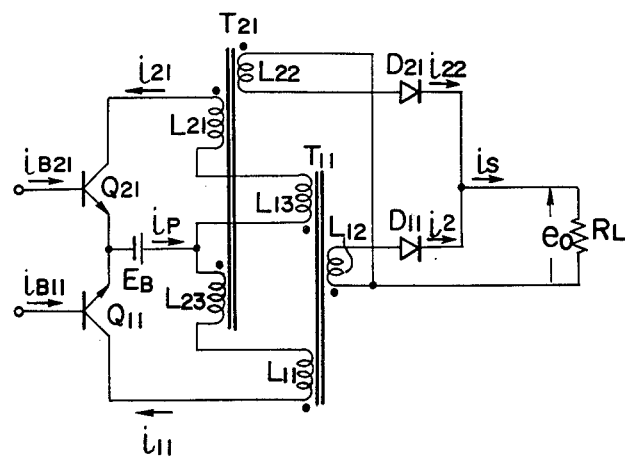
FIG. 3 is a diagram showing the circuit arrangement according to an embodiment of the present invention.

Referring now to FIG. 3, there is shown an embodiment of the present invention, which will be described hereinbelow.

The circuit according to this embodiment includes a transformer $T_{11}$ comprising a primary winding $L_{11}$, a secondary winding $L_{12}$ and an excitation winding $L_{13}$; a second transformer $T_{21}$ comprising a primary winding $L_{21}$, a secondary winding $L_{22}$ and an excitation winding $L_{23}$; a DC power source $E_B$; transistors $Q_{11}$ and $Q_{21}$; diodes $D_{11}$ and $D_{21}$; and a load $R_L$.

This embodiment also includes a series circuit consisting of the DC power source $E_B$, the excitation winding $L_{13}$ of the transformer $T_{11}$, the primary winding $L_{21}$ of the second transformer $T_{21}$ and the transistor $Q_{21}$; and a second series circuit consisting of the DC power source $E_B$, the excitation winding $L_{23}$ of the second transformer $T_{21}$, the primary winding $L_{11}$ of the transformer $T_{11}$ and the transistor $Q_{11}$.

In this embodiment, the secondary windings $L_{12}$ and $L_{22}$ of the respective transformers are connected in parallel with each other so that rectified outputs are of the same polarity. The rectified outputs are obtained through the diodes $D_{11}$ and $D_{21}$ which are coupled to the secondary windings $L_{12}$ and $L_{22}$ of the transformers $T_{11}$ and $T_{21}$ respectively by alternately rendering the transistors $Q_{11}$ and $Q_{21}$ conductive and non-conductive.

The arrangement according to this embodiment of the present invention comprises a combination of two circuits each including a transformer having an excitation winding, a primary winding and a secondary winding, wherein after energy has been accumulated in the excitation winding by flowing a current therethrough, a current which increases with time is made to flow through the primary winding; a current induced in the secondary winding by the current flowing through the primary winding and a current resulting from the energy accumulated in the excitation winding are superimposed upon each other; and the current resulting from such superimposition is rectified so as to provide an output.

Figure 4:
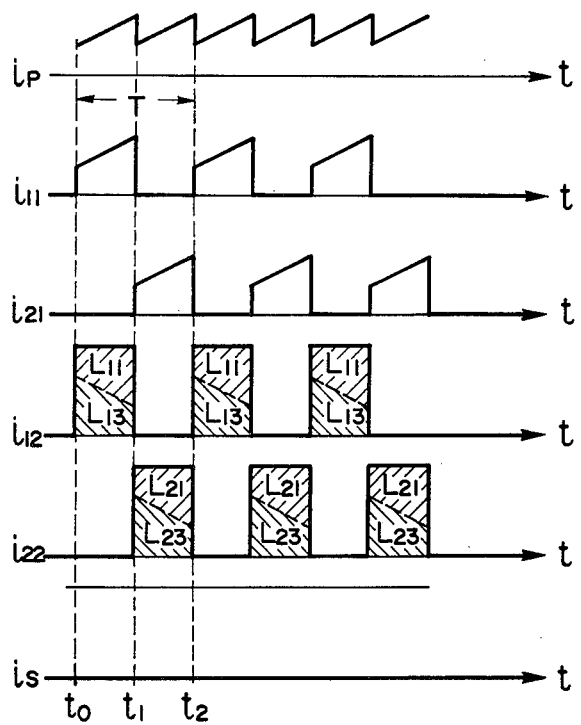
FIG. 4 is a view showing waveforms which occur during the steady state of the operation of the circuit shown in FIG. 3.

Referring to FIG. 4, there are shown waveforms which occur at various points in the circuit of FIG. 3.

At a given point of time $t_0$, a base current $i_{B11}$ is imparted to the transistor $Q_{11}$ so that the latter is rendered conductive, and at the same time, the base current $i_{B21}$ flowing into the transistor $Q_{21}$ is interrupted so that this transistor is rendered non-conductive. Assume that there still remains the energy accumulated in the excitation winding $L_{23}$ of the transformer $T_{21}$. Then, the primary current $i_{11}$ will rise to a value higher than zero and increase with time. Furthermore, assume that a certain amount of energy is stored in the excitation winding $L_{13}$ of the transformer $T_{11}$. Then, the secondary current $i_{12}$, which flows through the diode $D_{11}$ from the secondary winding $L_{12}$ of the transformer $T_{11}$, is made up of a combination of the current component resulting from the voltage induced in the secondary winding by the energy accumulated in the excitation winding $L_{13}$ and the current component resulting from the voltage induced therein by the current flowing through the primary winding $L_{11}$. The combined current has a flat wavefrom as shown in FIG. 4.

At a point time $t_1$ when there still remains the energy accumulated in the excitation winding $L_{13}$ of the transformer $T_{11}$, the base current $i_{B11}$ of the transistor $Q_{11}$ is interrupted so that this transistor is turned off, and at the same time, base current $i_{B21}$ is imparted to the transistor $Q_{21}$ so that this transistor is turned on; thus, the primary current $i_{11}$ becomes nil so that the secondary current $i_{12}$ also becomes nil. At this point, the secondary current $i_{21}$ is caused to have a value higher than zero and increase with time, as a result of which the magnetic flux $\Phi$ occurring in the core of the transformer $T_{11}$ becomes continuous. Due to the energy accumulated in the excitation winding $L_{23}$ of the transformer $T_{21}$ by the primary current $i_{11}$, the secondary current $i_{22}$, which flows through the diode $D_{21}$ from the secondary winding $L_{22}$ of the transformer $T_{21}$, is made up of a combination of the current component resulting from the voltage induced in the secondary winding $L_{22}$ by the energy accumulated in the excitation winding $L_{23}$ and the current component resulting from the voltage induced therein by the current flowing through the primary winding $L_{21}$, and it also has a flat waveform as shown in FIG. 4.

In this way, a current $i_S$ consisting of a combination of the aforementioned secondary currents $i_{12}$ and $i_{22}$ can provide a continuous DC current through the load $R_L$.

At a point of time $t_2$ when there still remains the energy accumulated in the excitation winding $L_{23}$, the base current $i_{B21}$ of the transistor $Q_{21}$ is interrupted so that this transistor is rendered non-conductive, and at the same time, base current $i_{B11}$ is imparted to the transistor $Q_{11}$ so that this transistor is once again rendered conductive; thus, the primary current $i_{21}$ becomes nil so that the secondary current $i_{22}$ also becomes nil.

In this way, it is possible to supply the continuous DC current $i_S$ to the load $R_L$ by repeating the aforementioned operation with the duration $t_0$–$t_2$ as one cyclic period $T$, so that a DC voltage $e_0$ of a flat waveform can be obtained. In this case, a current $i_p$ supplied from the DC power source $E_B$ is caused to flow taking a pulsating saw-tooth waveform such as shown in FIG. 4.

In the foregoing, discription has been made of the case where the excitation windings $L_{13}$ and $L_{23}$ have an equal number of turns and the primary windings $L_{11}$ and $L_{21}$ also have an equal number of turns as shown in FIG. 3. Further, the circuit operation is in the steady state. Description will now made of the case where the circuit operation is in a transient state.

The operation of the circuit shown in FIG. 3 will be explained with reference to FIG. 5 which shows current and voltage waveforms occurring at the various points in the circuit.

At a point of time $t_{10}$ when there is no energy stored in the transformer $T_{11}$ or $T_{12}$, base current $i_{B11}$ is imparted to the transistor $Q_{11}$ to render this transistor conductive, whereupon the primary current $i_{11}$ or the current $i_p$ supplied from the DC power source $E_B$ will increase from zero and the secondary current $i_{12}$, or the composite current $i_S$ will also increase from zero, so that the output voltage $e_0$ applied across the load $R_L$ will also build up from zero. In this way, energy will be gradually accumulated in the excitation winding $L_{23}$, and an excitation current will also be caused to flow through the primary winding $L_{11}$ so that energy in reverse direction which cannot be taken out at the load $R_L$ will be stored therein. This is due to the fact that no sufficient energy has yet been accumulated in the excitation winding $L_{13}$ to cancel out such an excitation current flowing through the primary winding $L_{11}$. Energy accumulated in the primary winding $L_{11}$ is much less than that accumulated in the excitation winding $L_{23}$. The reason for this is such that at that point, the output voltage $e_0$ is still very low and hence the voltage applied to the primary winding $L_{11}$ is still very low so that the excitation winding $L_{23}$ is predominantly being supplied from the DC power source $E_B$.

At a point of time $t_{11}$, the base current $i_{B11}$ of the transistor $Q_{11}$ is interrupted to render this transistor nonconductive, and at the same time, base current $i_{B21}$ is imparted to the transistor $Q_{21}$ to render this transistor conductive. The energy stored in the excitation winding $L_{23}$ results in the secondary current $i_{22}$, but since the energy in reverse direction which cannot be taken out at the load $R_L$ has been stored in the primary winding $L_{11}$ as mentioned above, a voltage in reverse direction will be induced in the excitation winding $L_{13}$, whereby the primary current $i_{21}$, or the current $i_p$ supplied from the DC power source $E_B$ will be prevented from flowing into the transistor $Q_{21}$. At the point of time $t_{11}$, therefore, the transistor $Q_{21}$ is ready to be turned on, but no collector current is permitted to flow therethrough.

It is to be noted that by the use of means such as described hereinafter in connection with FIG. 8, it is possible that a reverse current is permitted to flow through the primary winding $L_{21}$ so as to be collected at the DC power source $E_B$.

By permitting the reverse current to flow through the primary winding $L_{21}$ as mentioned just above, that component of the secondary current $i_{22}$ which is based on the energy in the excitation winding $L_{23}$ will thereby be cancelled out so that the difference between the reverse current and the secondary current $i_{22}$ will constitute the composite current $i_S$. However, since the energy accumulated in the excitation winding $L_{23}$ is much greater than that accumulated in the primary winding $L_{11}$ as mentioned above, the energy of the primary winding $L_{11}$ will vanish soon, whereupon a collector current will begin to flow through the transistor $Q_{21}$ so that the primary current $i_{21}$ which can be taken out at the load $R_L$, i.e., the currently $i_p$ from the DC power source $E_B$ will also begin to flow through the primary winding $L_{21}$. Moreover, the secondary current $i_{22}$, which results from the energy stored in the excitation winding $L_{23}$ and energy stored in the primary winding $L_{21}$, will be caused to flow through the secondary winding $L_{22}$ and will further increase with time.

At a point of time $t_{12}$, the transistor $Q_{11}$ is again rendered conductive, and at the same time, the transistor $Q_{21}$ is rendered non-conductive; thus, the primary current $i_{11}$, or the current $i_p$ from the DC power source will have a higher value so that the output voltage $e_0$ will further increase, due to the fact that energy has been accumulated in the excitation winding $L_{13}$, and energy still remain in the excitation winding $L_{23}$. Assuming that the transistors $Q_{11}$ and $Q_{21}$ are alternately rendered conductive and non-conductive with the duration $t_{10}-t_{12}$ as one cyclic period $T$ and that the respective excitation and primary windings of the transformers $T_{11}$ and $T_{21}$ have an equal number of turns, that is to say $L_{23}=L_{11}=L_{13}=L_{21}$, then the output voltage $e_0$ will be given as follows:

$$e_0 = \frac{E_B}{2r_2}(1 - e^{-\alpha t}) \quad (1)$$

where $$r_2 = \sqrt{\frac{L_{11}}{L_{12}}} = \sqrt{\frac{L_{21}}{L_{22}}}$$

$$\alpha = \frac{2r_2^2 R_L}{L_{21}}$$

As can be seen from the equation (1), the output voltage $e_0$ will continuously and exponentially build up irrespective of the cyclic period $T$. The average of the current $i_p$ from the DC power source $E_B$ will constitute a pulsating current of a saw-tooth waveform which gradually converges to a constant value while increasing with time. The cyclic period of the saw-tooth waveform is determined from the aforementioned cyclic period $T$, and the shorter the cyclic period, the lower the amplitude of the saw-tooth waveform portion.

Figure 5:
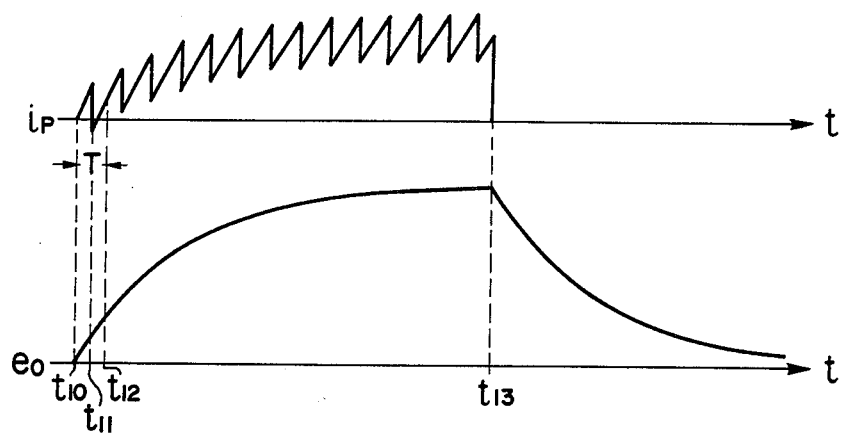
FIG. 5 is a view showing waveforms which occur during the transient state of the operation of the circuit shown in FIG. 3.

It will be seen from FIG. 5 that the primary current $i_{11}$ flowing through the transistor $Q_{11}$ and the primary current $i_{21}$ flowing through the transistor $Q_{21}$ are different in amplitude from each other, and that the cyclic period of the saw-tooth waveform is equal to the cyclic period $T$ during which the transistors $Q_{11}$ and $Q_{21}$ are rendered conductive and non-conductive. This is due to the fact that the residual energy in each of the excitation windings $L_{13}$ and $L_{23}$ is non-uniform. By adjusting the point of time when the transistors $Q_{11}$ and $Q_{21}$ are turned on and off respectively, it is possible to make the amplitudes of the primary currents $i_{11}$ and $i_{21}$ equal to each other as in the waveform of the current $i_p$ shown in FIG. 4, whereby the cyclic period of the saw-tooth waveform can be made to be equal to $T/2$. Furthermore, as can be seen from the foregoing equation (1), the output voltage $e_0$ reaches a steady-state value given by $E_B/2r_2^2$. The lower the transient-state value of the output voltage $e_0$ with respect to the steady-state value thereof, the sharper becomes the waveform rise-up.

At a point of time $t_{13}$, the transistors $Q_{11}$ and $Q_{21}$ are rendered non-conductive at the same time, so that the energy accumulated in each of the excitation windings $L_{13}$ and $L_{23}$ will be evenly discharged which will thus result in the secondary currents $i_{12}$ and $i_{22}$. As a result, the output voltage $e_0$ will be given as follows:

$$e_0 = e_0(0) \cdot e^{-\alpha t} \quad (2)$$

The factor $e_0(0)$ in the above equation (2) is given in terms of the amplitude of the output voltage $e_0$ when the transistors $Q_{11}$ and $Q_{21}$ are turned off at the same time, and it decreases continuously and exponentially. The output voltage $e_0$ is continuous even at a point of time when it changes from increasing to decreasing.

When the circuit according to the embodiment of FIG. 3 operates so as to produce such waveforms as shown in FIG. 5, it serves as a DC-DC converter for converting the voltage of the DC power source $E_B$ into a different voltage. Furthermore, by suitably selecting the circuit constants, it is possible to determine the time constants for the rise and fall of the output voltage $e_0$ as desired. Still furthermore, according to the present invention, it is possible to obtain continuous and ripple-free output voltage $e_0$.

Figure 6:
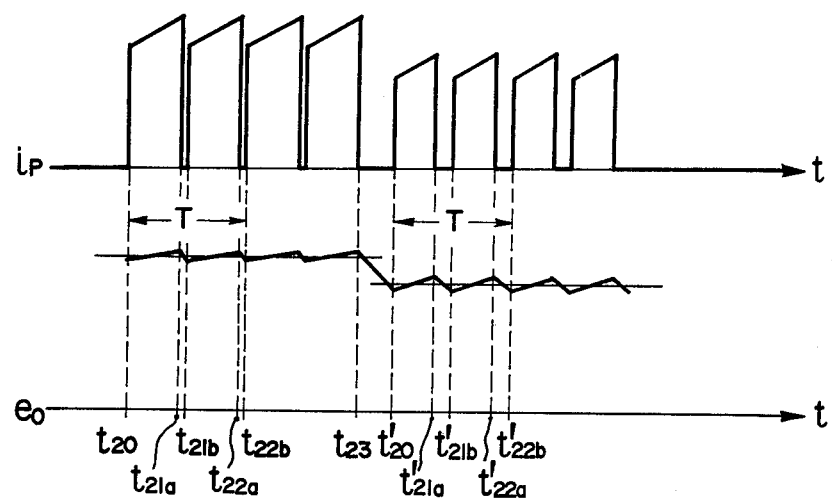
FIGS. 6 and 7 are views useful for explaining the operation of some modifications to the circuit shown in FIG. 3.

Referring to FIG. 6, there are shown other operational waveforms which may occur in the circuit of FIG. 3. Description will now be made of means for controlling the output voltage $e_0$, with reference to the drawings.

Assume that $t_{20}$ indicates a point of time just before the point of time when the output voltage $e_0$ reaches the steady-state value. By turning on the transistor $Q_{11}$ and simultaneously turning off the transistor $Q_{21}$ at the point of time $t_{20}$, the output voltage $e_0$ will build up until it reaches the steady-state value. By simultaneously turning off the transistors $Q_{11}$ and $Q_{21}$ at a point of time $t_{21a}$, the output voltage $e_0$ will begin to decrease. By turning on the transistor $Q_{21}$ and simultaneously turning off the transistor $Q_{11}$ at a point of time $t_{21b}$ when the output voltage $e_0$ assumes the same value as that at the point of time $t_{20}$, the output voltage $e_0$ will again build up. By simultaneously turning off the transistors $Q_{11}$ and $Q_{21}$ at a point of time $t_{22a}$ when the output voltage $e_0$ assumes the same value as that at the point of time $t_{21a}$, the output voltage $e_0$ will again begin to decrease. By turning on the transistor $Q_{11}$ and simultaneously turning off the transistor $Q_{21}$ at a point of time $t_{22b}$ when the output voltage $e_0$ assumes the same value as that at the point of time $t_{20}$, the output voltage $e_0$ will again build up.

Thus, repetition of the aforementioned operation with the duration from $t_{20}$ to $t_{22b}$ as one cyclic period T results in the output voltage $e_0$ containing small triangular ripples and having a level lower than the steady-state level.

By turning off the transistors $Q_{11}$ and $Q_{21}$ at a point of time $t_{23}$ and by permitting the operation to be performed for a longer period than the foregoing duration $t_{21a}$–$t_{21b}$, the output voltage $e_0$ will be made lower than the level which it had at the point of time $t_{20}$. By again turning on the transistor $Q_{11}$ and simultaneously turning off the transistor $Q_{12}$ at a point of time $t_{20}'$, the output voltage $e_0$ will be made to build up. By turning off the transistors $Q_{11}$ and $Q_{21}$ at a point of time $t_{21a}'$ when the output voltage $e_0$ has become slightly higher than the level at the point of time $t_{20}$, the output voltage $e_0$ will be made to begin to decrease. By turning on the transistor $Q_{21}$ and simultaneously turning off the transistor $Q_{11}$ at a point of time $t_{21b}'$ when the output voltage $e_0$ has the same level as that at the point of time $t_{20}'$, the output voltage $e_0$ will again be made to build up. Furthermore, by turning off the transistors $Q_{11}$ and $Q_{21}$ at a point of time $t_{22a}'$ when the output voltage $e_0$ has the same level as that at the point of time $t_{21a}'$, the output voltage $e_0$ will be made to decrease. By turning on the transistor $Q_{11}$ and simultaneously turning off the transistor $Q_{21}$ at a point of time $t_{22b}'$ when the output voltage $e_0$ has the same level as that at the point of time $t_{20}'$, the output voltage $e_0$ will again be made to build up.

Thus, repetition of the foregoing operation with the duration $t_{20}'$–$t_{22b}'$ as one cyclic period T results in the output voltage $e_0$ containing small triangular ripples and the amplitude thereof being lower than that during the aforementioned period $t_{20}$–$t_{23}$.

The current $i_p$ from the DC power source $E_B$ rises from a certain value at the point of time $t_{20}$, increases with time, reaches a peak value at the point of time $t_{21a}$, and thereafter becomes nil. At the point of time $t_{21b}$, the current $i_p$ rises from the same value as that at the point of time $t_{20}$, increases with time, reaches a peak value at the point of time $t_{22a}$, the peak value being equal to that at the point of time $t_{21a}$, and thereafter becomes nil. At the point of time $t_{22b}$, the current $i_p$ rises up from the same value as that the point of time $t_{20}$ and increases with time. Thus, through repetition of the aforementioned operation, the current $i_p$ reaches a peak value at a point of time $t_{23}$, the peak value being equal to that at the point of time $t_{21a}$, and thereafter becomes nil.

At the point of time $t_{20}'$, the current $i_p$ rises with a lower value than that at the point of time $t_{20}$, and increase with time; and at the point of time $t_{21a}'$, the current $i_p$ reaches a peak value lower than that at the point of time $t_{21a}$, and thereafter becomes nil. At the point of time $t_{21b}'$, the current $i_p$ rises up with the same value as that at the point of time $t_{20}'$, and increases with time; and at the point of time $t_{22a}'$, the current $i_p$ reaches a peak value equal to that the point of time $t_{21a}'$, and thereafter becomes nil. At the point of time $t_{22b}'$, the current $i_p$ rises up with the same value as that at the point of time $t_{20}'$ and increases with time.

In this way, the aforementioned operation is repeated so that there is produced such a waveform of the current $i_p$ from the DC power source $E_B$ as shown in FIG. 6.

As can be seen from FIG. 6, for the period for which the output voltage $e_0$ is higher, the rise-up value of the current $i_p$ from the DC power source $E_B$ is higher, and the ratio of the period for which the aforementioned current $i_p$ is flowing to the period for which it is interrupted to be nil is lower. For the period for which the output voltage $e_0$ is lower, on the other hand, the rise-up value of the current $i_p$ from the DC power source $E_B$ is lower than that for the period for which the output voltage $e_0$ is higher, and the ratio of the period for which the said current $i_p$ is flowing to the period for which it is interrupted to be nil is higher. In this way, the output voltage $e_0$ becomes continuous regardless of the discontinuity of the current $i_p$ from the DC power source $E_B$.

As will be appreciated from the foregoing explanation, it is possible to maintain the output voltage $e_0$ at any desired level which is lower than the steady-state level thereof, by inserting a period during which the transistors $Q_{11}$ and $Q_{21}$ are both turned off between the periods during which the transistors $Q_{11}$ and $Q_{21}$ are alternately rendered conductive and non-conductive, and by changing the ratio of the period during which one of the transistors $Q_{11}$ and $Q_{21}$ is turned on to the period during which the transistors $Q_{11}$ and $Q_{21}$ are both turned off.

Figure 7:
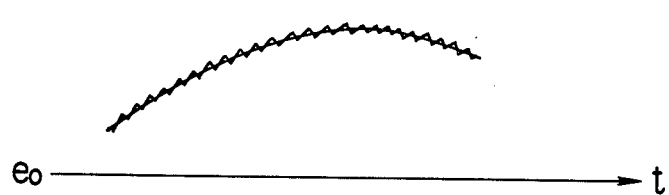

It is also possible to make the output voltage $e_0$ change continuously. FIG. 7 illustrates a response characteristic in such a case. The output voltage $e_0$ can be approximated by continuation of triangular waveforms having a lower amplitude. Thus, this invention is also applicable in the case where the waveform of the output voltage $e_0$ is lower in respect of rise and fall rates than that shown in FIG. 5.

Figure 8:
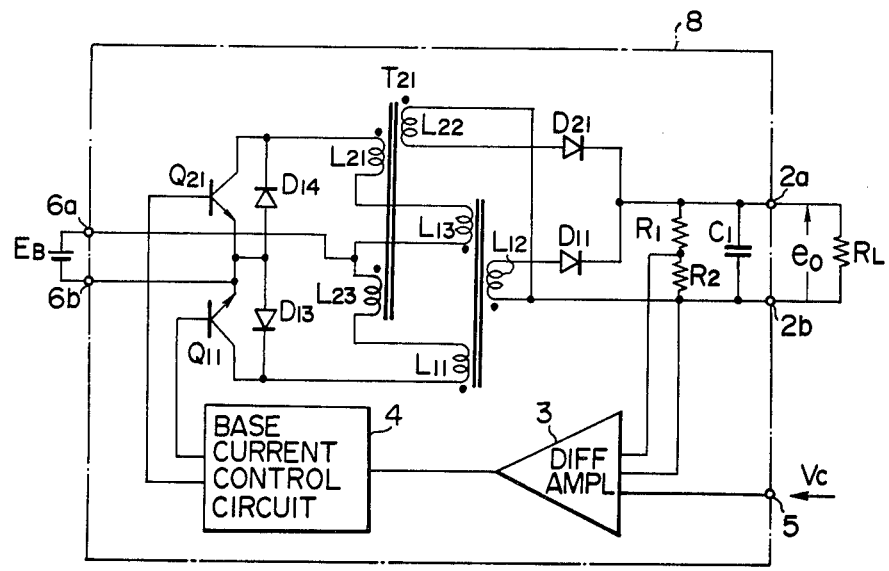
FIG. 8 is a diagram showing the circuit arrangement according to another embodiment of this invention.

Referring to FIG. 8, there is shown another embodiment of this invention, which will be described hereinbelow. The embodiment of FIG. 8 is basically similar to that of FIG. 3, and therefore like parts are indicated by like references.

The embodiment of FIG. 8 includes output terminals $2a$ and $2b$, a differential amplifier 3, a base current control circuit 4, an input terminal 5 of the differential amplifier 3 to which a control voltage $V_c$ is imparted; input terminals $6a$ and $6b$ of a DC power source $E_B$, divider resistors $R_1$ and $R_2$, a capacitor $C_1$ and a power control circuit 8. Diodes $D_{13}$ and $D_{14}$ connected in parallel with transistors $Q_{11}$ and $Q_{21}$ are provided for the purpose of flowing a reverse current as was also described in connection with FIG. 5.

More specifically, a reverse voltage is induced in the excitation winding $L_{23}$ by the excitation current accumulated in the primary winding $L_{11}$, and a reverse voltage is also induced in the primary winding $L_{21}$ by the energy accumulated in the excitation winding $L_{23}$. However, the sum of the reverse voltages induced in the excitation winding $L_{13}$ and primary winding $L_{21}$ respectively will be clamped by the voltage of the DC power source $E_B$, so that a reverse current flowing through a closed circuit consisting of the primary winding $L_{21}$, excitation winding $L_{13}$, DC power source $E_B$ and diode $D_{14}$ will be collected at the DC power source $E_B$ as excessive energy without waste. Thus, if the circuit conditions are set up so as to ensure that the transistor $Q_{11}$ or $Q_{21}$ will begin to conduct at the start of each cyclic period, then it will be possible to handle the reverse current by utilizing the diode $D_{14}$ alone and by making the length of one cyclic period T of the operational waveform shown in FIG. 5 shorter than a predetermined length. Thus making it possible to eliminate the diode $D_{13}$. Furthermore, by means of the diodes $D_{13}$ and $D_{14}$, spike voltages which tend to be induced in the primary winding and excitation winding of each transformer due to the leakage inductances between the primary and secondary windings thereof and between the excitation and secondary windings thereof can also be collected at the DC power source $E_B$.

With the conventional switching power source devices, it has been required that a special spike absorbing winding be provided for the purpose of collecting at the DC power source thereof spike voltages tending to occur when flyback voltage rises up.

In contrast thereto, according to the present invention, no such special spike absorbing winding is required; the sum of the spike voltages occurring in the excitation winding and primary winding is clamped by the voltage of the DC power source so as to be collected thereat as excessive energy. Thus, it is possible to simplify the circuit arrangement, minimize power loss and prevent the transistors $Q_{11}$ and $Q_{21}$ from being subjected to breakage due to excessive voltage.

The power control circuit of FIG. 8 is constructed by adding a feedback circuit to the circuit of FIG. 3. In this circuit, continuous triangular waveform voltages obtained between the output terminals $2a$ and $2b$ of the differential amplifier 3 are compared with the input control voltage $V_c$, the resultant signal is amplified for controlling the period during which the transistors $Q_{11}$ and $Q_{21}$ are conducting and non-conducting. Thus similar continuous triangular waveform voltages, similar in waveform to each other, proportional to the input control voltage $V_c$ can be obtained across the load $R_L$.

Assuming that the control voltage $V_c$ applied to the input terminal 5 is positive, then the output voltage $e_0$ obtained between the output terminals $2a$ and $2b$ of the differential amplifier 3 is compared with the positive control voltage $V_c$, and the resultant signal is amplified and then supplied to the base current control circuit 4, which is controlling the period for which the transistors $Q_{21}$ and $Q_{11}$ are alternately conducting and non-conducting and the period for which the transistors $Q_{21}$ and $Q_{11}$ are both non-conducting, so as to ensure that the output voltage $e_0$ obtained between the output terminals $2a$ and $2b$ of the differential amplifier 3 is proportional to the positive control voltage $V_c$. In this way, a voltage proportional to the positive control voltage $V_c$ is obtained as the output voltage $e_0$, and the latter is reduced to $e_0 \cdot R_2/(R_1+R_2)$ by means of the divider resistors $R_1$ and $R_2$ and then applied to the other terminal of the differential amplifier 3, so that negative feedback is achieved. Thus, the output voltage $e_0$ becomes similar in waveform to the control voltage $V_c$ and is given by the following expression:

$$e_0 \approx \frac{R_1 + R_2}{R_2} \cdot V_c \qquad (3)$$

The capacitor $C_1$ is inserted when it is necessary to eliminate the small triangular waveform ripples as well as small ripples which tend to occur during switching operations of the transistors $Q_{11}$ and $Q_{21}$. The capacitance value for this capacitor may be low.

The embodiment shown in FIG. 8 may most commonly applicable to stabilized DC power supply device. By using a fixed or variable reference voltage as the control voltage $V_c$, the output voltage $e_0$ can be fixed or varied. Unlike the conventional switching power supply devices, in the stabilized DC power supply device according to this embodiment, no complicated smoothing circuit components are needed in the output stage thereof, and the capacitor $C_1$ of a low capacitance value may only be inserted as occasion demands, so that a very high response speed is achieved. Though it depends on the switching speed of the transistors $Q_{11}$ and $Q_{21}$, the response speed of the circuit according to this embodiment can be made as high as that of the conventional series dropper type linear circuit power supply device. Furthermore, the currents flowing through respective portions of the circuit are substantially constant without substantial variations with time; therefore, selection of the circuit elements can easily be effected, and in addition, power loss can be minimized. Still furthermore, the number of turns of each winding of the transformer may be small as mentioned above, and an output larger than that at the saturation magnetic flux density can be taken out; thus, loss in the core is relatively small, so that the total loss in the transformer can be minimized, and in addition the transformer per se can be miniaturized and made to be of light weight. Since no smoothing circuit is required, there is neither loss caused by a smoothing choke nor loss caused by flowing a large current through a smoothing capacitor.

In this way, according to the present invention, there is provided a switching power supply device with very low loss and very high power efficiency.

Moreover, as compared with the conventional switching power supply device, the circuit according to this invention can greatly reduce spike noise by virtue of the fact that the peak value of current flowing through respective portions thereof is low and in addition spike currents can effectively be collected at the DC power source. For the various reasons mentioned above, a switching power supply circuit is provided which is of small size, light weight, high performance, high reliability and inexpensive. In order to achieve DC-wise isolation between the DC power source $E_B$ side and the output circuit, coupling means such as photocoupler or the like is inserted in an intermediate portion of the amplification-control system of the base current control circuit 4; thus, an input-output isolation type switching power supply circuit can readily be provided.

Figure 9:
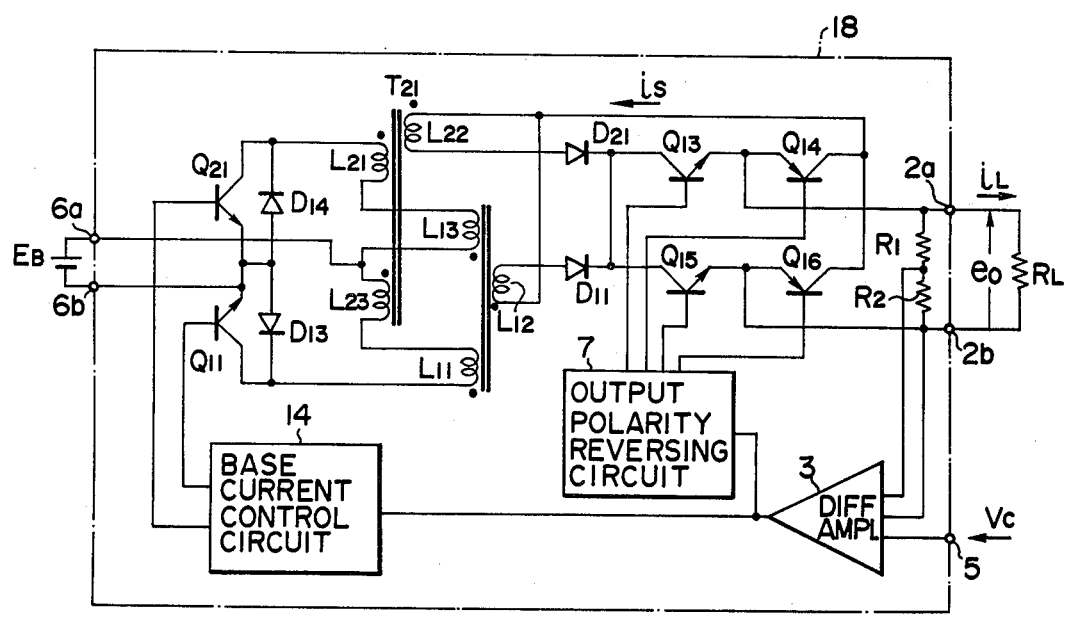
FIG. 9 is a diagram showing the circuit arrangement according to still another embodiment of this invention.

Referring to FIG. 9, there is shown a further embodiment of this invention which is applicable in the case where an AC voltage is utilized as the control voltage $V_c$. Description will next be made of this embodiment.

In FIG. 9, parts similar in function to those of FIG. 3 and 8 are indicated by similar references. The circuit according to this embodiment includes an output polarity reversing circuit 7 constituted by transistors $Q_{13}$, $Q_{14}$, $Q_{15}$ and $Q_{16}$, an output polarity reversal control circuit 14, and a power control circuit 18 responsive to AC.

Figure 10:
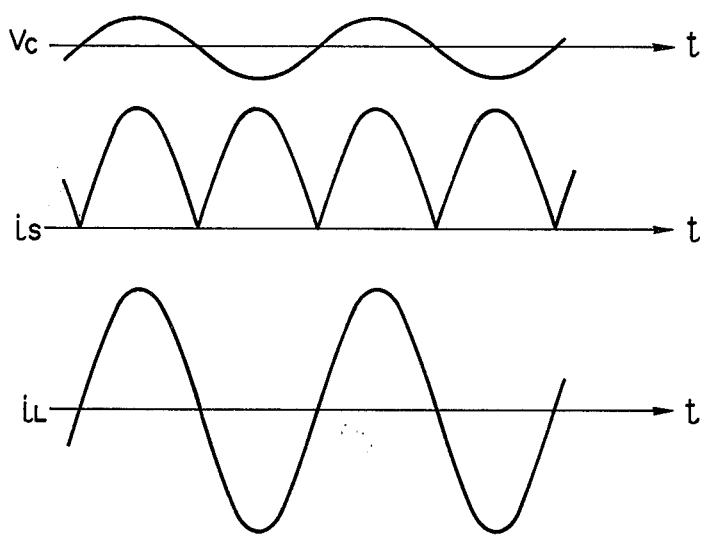
FIG. 10 is a view showing waveforms which occur during the operation of the circuit shown in FIG. 9.

FIG. 10 illustrates operating voltage and current waveforms which occur at respective portions of the circuit shown in FIG. 9. The operation of this circuit will be described below.

If an AC input control voltage indicated at $V_c$ in FIG. 10 is applied to an input terminal 5, then output voltage $e_0$ obtained between output terminals $2a$ and $2b$ of a differential amplifier 3 will be compared with the AC input control voltage $V_c$, and the resultant signal will be amplified and then supplied to a base current control circuit 14. Furthermore, the AC input control voltage $V_c$ is full-wave-rectified to be a pulsating wave by which transistors $Q_{11}$ and $Q_{21}$ are turned on and off so that a composite current $i_S$ available from secondary windings $L_{12}$ and $L_{22}$ through diodes $D_{11}$ and $D_{12}$ constitutes a pulsating output such as shown in FIG. 10, which is imparted to the output polarity reversing circuit comprising the transistors $Q_{13}$, $Q_{14}$, $Q_{15}$ and $Q_{16}$. At the same time, the differential output of the differential amplifier 3 is imparted to the output polarity reversal control circuit 7, whereby control is effected such that when the AC control voltage $V_c$ is positive, the transistors $Q_{13}$ and $Q_{16}$ are turned on and at the same time the transistors $Q_{14}$ and $Q_{15}$ are turned off so that a current in a positive direction is caused to flow through the load $R_L$, whereas when the AC control voltage $V_c$ is negative, the transistors $Q_{13}$ and $Q_{16}$ are turned off and at the same time the transistors $Q_{14}$ and $Q_{15}$ are turned on so that a current in a negative direction is caused to flow through the load $R_L$.

Thus, the aforementioned composite current $i_S$ results in a load current as indicated at $i_L$ in FIG. 10 flowing through the load $R_L$, and as a result, output voltage $e_0$ proportional to the AC input control voltage $V_c$ is obtained across the load $R_L$. The differential amplifier 3 is provided with a voltage $e_0 \cdot R_2/(R_1+R_2)$, which is compared with the AC control voltage $V_c$ so that negative feedback is provided; thus, the output voltage $e_0$ is given by $$e_0 \approx \frac{R_1 + R_2}{R_2} \cdot V_c$$

and which is similar in waveform to the AC control voltage $V_c$. The control circuit 18 shown in FIG. 9 is responsive to voltages from DC to high frequency AC.

As will be appreciated from what has been described above, the present invention is most conveniently and effectively applicable to such applications as, for example, common amplifiers, servo amplifiers, AC-AC power converters, DC-AC power converters, AC constant voltage power supply devices, stabilized DC power supply devices the output of which can be varied from positive to negative, and so forth.

In the conventional power amplifiers, loss has inevitably occurred in active elements such as transistors or the like which have been used in the form of linear circuits. In contrast thereto, according to the present invention, such active elements are employed as switching elements so that loss tending to occur therein is minimized, and in addition, much higher power efficiency than those of the conventional power amplifiers can be achieved through the rational operation as explained with reference to FIG. 8. Furthermore, according to the present invention, there is no need to provide any special DC power source using a transformer for power amplifiers, since the signal input and output terminals can easily be isolated from the commercial power line even when a DC power source is established by directly rectifying power from the commercial power line, and thus, there is provided a power amplifier which is inexpensive, small in size and light in weight. By applying this invention to the respective applications mentioned above, it is possible to obtain devices being of high efficiency, of high performance, of small size, of light weight, of high reliability and inexpensive.

Figure 11:
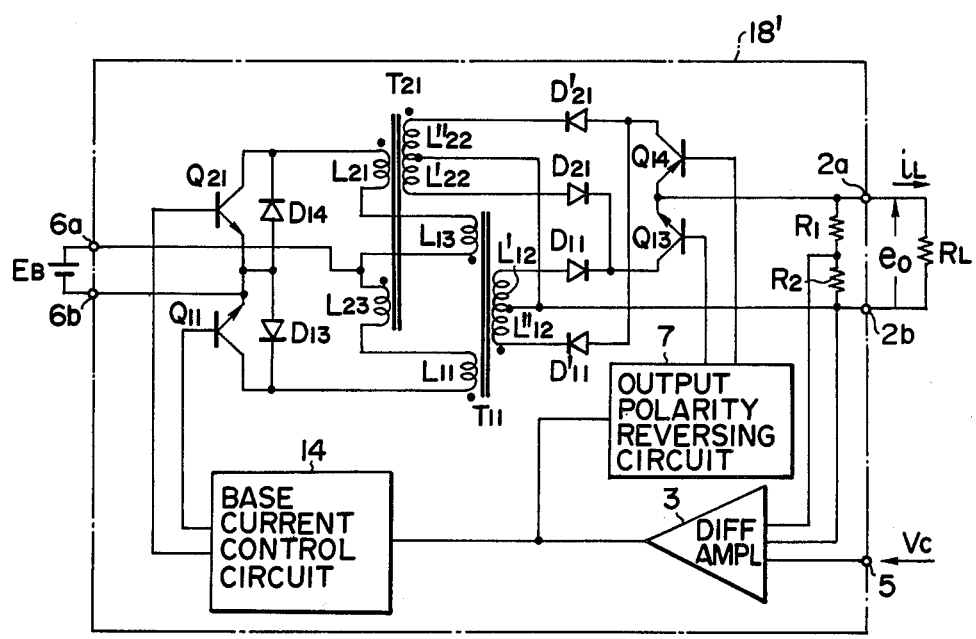
FIG. 11 is a circuit diagram showing a modification to the circuit shown in FIG. 9.

Referring to FIG. 11, there is shown a modification to the output polarity reversing circuit provided in the embodiment of FIG. 9.

In this figure, parts similar in function to those of FIG. 9 are indicated by similar references. Diodes $D_{11}'$ and $D_{21}'$ are arranged to perform the same functions as the diodes $D_{11}$ and $D_{21}$. Indicated at 18' is a power control circuit responsive to AC.

In this output polarity reversing circuit, intermediate or center taps are provided on the secondary windings $L_{12}$ and $L_{22}$ of transformers $T_{11}$ and $T_{21}$ respectively in such a manner that the opposite side portions of each winding about the center tap thereof have an equal number of turns and are of of the same polarity. Both of the center taps are connected in common with one end, indicated at $2b$, of the load $R_L$; those ends of the secondary windings which are positive with respect to the two center taps are connected with the collector of an NPN transistor $Q_{13}$ through diodes $D_{11}$ and $D_{21}$, the emitter of the transistor $Q_{13}$ being connected with the emitter of a PNP transistor $Q_{14}$, and those ends of the secondary windings which are negative with respect to the two center taps are connected in common with the collector of the PNP transistor $Q_{14}$ through diodes $D_{11}'$ and $D_{21}'$, the connection point between the emitter of the NPN transistor $Q_{13}$ and the emitter of the PNP transistor $Q_{14}$ being coupled to the other end $2a$ of the load $R_L$.

In the arrangement mentioned above, when the AC control voltage $V_c$ is positive, the output polarity reversal control circuit 7 effects such a control that the PNP transistor $Q_{14}$ is turned off at the same time when the NPN transistor $Q_{13}$ is turned on, so that a current flowing through a closed circuit consisting of the secondary winding $L_{12}'$, diode $D_{11}$, NPN transistor $Q_{13}$ and load $R_L$ and a current flowing through a closed circuit consisting of the secondary winding $L_{22}'$, diode $D_{21}$, NPN transistor $Q_{13}$ and load $R_L$ are combined with each other so that a current a positive direction is caused to flow through the load $R_L$. When the AC control voltage $V_c$ is negative, on the other hand, the output polarity reversal control circuit 7 effects such control that the PNP transistor $Q_{14}$, is turned on at the same time when the NPN transistor $Q_{13}$ is turned off, so that a current flowing through a closed circuit consisting of the other secondary winding $L_{12}''$, load $R_L$, PNP transistor $Q_{14}$ and diode $D_{11}'$ and a current flowing through a closed circuit consisting of the secondary winding $L_{22}''$, load $R_L$, PNP transistor $Q_{14}$ and diode $D_{21}'$ are combined with each other so that a current in a negative direction is caused to flow through the load $R_L$.

Thus, by alternately turning on and off the aforementioned NPN transistor $Q_{13}$ and PNP transistor $Q_{14}$ depending on the polarity of the AC input control voltage $V_c$, it is possible to obtain an AC output voltage $e_0$ which consists of continuous waveform segments similar in shape to each other and is proportional to the AC input control voltage $V_c$. Such an AC output voltage $e_0$ is given by the following expression:

In the circuit arrangement of FIG. 11, the number of the transistors constituting the output polarity reversing circuit can be made to be less than that of the embodiment shown in FIG. 9 by two, and the transistors inserted in the current path can be provided one for each polarity; thus, the loss occurring in the transistors can be made half that in the circuit of FIG. 9.

Moreover, in this embodiment, since it is possible that the center taps provided on the secondary windings of the respective transformers or the emitters of the transistors $Q_{13}$ and $Q_{14}$ may be at ground potential, the driver circuit for the transistors $Q_{13}$ and $Q_{14}$ can easily be constructed.

While preferred embodiments of this invention have been described in detail, it will be obvious to those skilled in the art that the invention may be embodied otherwise without departing from its spirit and scope.

What is claimed is:

1. A power control circuit comprising:
   (a) at least one DC power source;
   (b) a transformer including a primary winding, a secondary winding and an excitation winding;
   (c) an excitation coil connected in series with said primary winding;
   (d) first switching means for connecting said transformer in a first series circuit including said primary winding, said DC power source and said excitation coil;
   (e) second switching means for connecting said transformer in a second series circuit including said excitation winding and said DC power source;
   (f) a rectifier circuit connected with driving a load; and
   (g) said first and second switching means operative for alternately connecting said first and second series circuits wherein energy stored in said excitation winding during connection of said second series circuit induces a current in said secondary winding during connection of said first series circuit, said induced current superimposed on a current induced by said primary winding on said secondary winding during operation of said second series circuit, said superimposed current rectified by said rectifier circuit.

2. A power control circuit as recited in claim 1, wherein said first and second switching means comprise transistors.

3. A power control circuit comprising:
   (a) a DC power source;
   (b) a first transformer having a primary winding, a secondary winding and an excitation winding;
   (c) a second transformer having a primary winding, a secondary winding and an excitation winding;
   (d) first switching means actuable for connecting said power source in a first series circuit with said excitation winding of said first transformer and said primary winding of said second transformer;
   (e) second switching means actuable for connecting said power source in a second series circuit with said excitation winding of said second transformer and said primary winding of said first transformer;
   (f) circuit means for connecting said secondary winding of said first and second transformers together to provide outputs of the same polarity for driving a load;
   (g) a rectifier circuit connected with said secondary winding of said first and second transformers and to said load;
   (h) said first and second switching means operative for alternately connecting said first and second series circuits wherein energy is stored in said excitation winding of said first transformer during connection of said first series circuit and energy is stored in said excitation winding of said second transformer during connection of said second series circuit and wherein said stored energy of said excitation winding of said first transformer induces a current in said secondary winding of said first transformer during connection of said second series circuit, said induced current supperimposed on a current induced by said primary winding of said first transformer on said secondary winding of said first transformer to provide a first superimposed current, and said stored energy of said excitation winding of said second transformer induces a current in said secondary winding of said second transformer during connection of said first series circuit, said induced current superimposed on a current induced by said primary winding of said second transformer on said secondary winding of said second transformer to provide a second superimposed current; and
   (i) said load connected to receive said first and second superimposed currents.

4. A power control circuit as recited in claim 3, wherein said first and second switching means comprise first and second transistors respectively.

5. A power control circuit according to claim 4, further comprising a differential amplifier connected with said rectifier circuit through an output polarity reversing circuit; and a base current control circuit connected between said differential amplifier and the bases of said first and second transistors, wherein an output voltage obtained at the output terminal of said power control circuit is compared with an AC input control voltage in said differential amplifier; a differential output resulting from said comparison is full-wave-rectified to be a pulsating wave by which said first and second transistors are alternately rendered conductive and non-conductive respectively and said first and second transistors are both rendered non-conductive; the resultant pulsating output is imparted to said output polarity reversing circuit so that the latter is operated depending on the polarity of said AC control voltage, whereby there are provided continuous output voltages similar in waveform to each other and proportional to said AC input control voltage, said continuous output voltages being applied to a load; and said output voltages are compared with the AC input control voltage so that negative feedback is provided.

6. A power control circuit according to claim 5, wherein center taps are provided on the secondary windings of said first and second transformers in such a manner that the opposite side portions of each secondary winding about the center tap thereof have an equal number of turns and the polarity said center taps being connected in common with one end of said load; those ends of said secondary windings which are positive with respect to said center taps are connected with the collector of a third transistor of a first conductivity type through rectifier diodes respectively; the emitter of said third transistor is connected with the emitter of a fourth transistor of a second coductivity type; those ends of said secondary windings are negative with respect to said center taps are connected with the collector of said fourth transistor through rectifier diodes respectively; the connection point between the emitters of said third and fourth transistors is coupled to the other end of the load; and an output polarity reversing circuit is provided which is designed such that said third and fourth transistors are alternately rendered conductive and non-conductive depending on the polarity of the AC input control voltage, whereby AC output proportional to the AC input control voltage is applied to the load.

7. A power control circuit as recited in claim 3, further comprising switch control means for controlling said first and second switching means for sequentially actuating and deactuating said first and second switching means and for selecting an adjustable time period between deactuation of one of said first and second switching means and actuation of the other of said first and second switching means.

8. A power control circuit as recited in claim 7, further comprising a feedback circuit comprising a differential amplifier having a first input connected to an output of said rectifier circuit and a second input connected for receiving a control voltage signal, said differential amplifier providing an output for controlling said switch control means.

9. A power control circuit according to claim 7, wherein the excitation windings and the primary windings of said first and second transformers have an equal number of turns.

10. A power control circuit according to claim 3, wherein the excitation windings and the primary windings of said first and second transformers have an equal number of turns.

* * * * *